United States Patent
Ho et al.

(10) Patent No.: US 11,144,244 B2
(45) Date of Patent: Oct. 12, 2021

(54) COMMAND TRANSMITTING METHOD WITH TEMPORARY STORING COMMANDS BY MEMORY INTERFACES FOR REWRITABLE NON-VOLATILE MEMORY MODULES, MEMORY CONTROL CIRCUIT UNIT AND MEMORY STORAGE DEVICE

(71) Applicant: PHISON ELECTRONICS CORP., Miaoli (TW)

(72) Inventors: Kuo-Hwa Ho, Miaoli (TW); Chih-Ming Chen, Miaoli (TW)

(73) Assignee: PHISON ELECTRONICS CORP., Miaoli (TW)

( * ) Notice: Subject to any disclaimer, the term of this patent is extended or adjusted under 35 U.S.C. 154(b) by 38 days.

(21) Appl. No.: 16/587,044

(22) Filed: Sep. 29, 2019

(65) Prior Publication Data
US 2021/0064283 A1  Mar. 4, 2021

(30) Foreign Application Priority Data
Aug. 30, 2019 (TW) ................................. 108131205

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| 10,235,309 | B1 * | 3/2019 | Markus | G06F 3/0611 |
| 2016/0124873 | A1 * | 5/2016 | Xu | G06F 1/3203 |
| | | | | 711/105 |
| 2016/0239373 | A1 * | 8/2016 | Shah | G06F 11/0793 |

FOREIGN PATENT DOCUMENTS

TW   I449048   8/2014

\* cited by examiner

*Primary Examiner* — Jane Wei
(74) *Attorney, Agent, or Firm* — JCIPRNET

(57) ABSTRACT

A command transmitting method, a memory control circuit unit and a memory storage device are provided. The method includes: transmitting a plurality of command sequences and a state read command sequence to a memory interface coupled to a rewritable non-volatile memory module; and storing the plurality of command sequences by the memory interface, and transmitting the state read command sequence to the rewritable non-volatile memory module.

12 Claims, 6 Drawing Sheets

COMMAND TRANSMITTING METHOD WITH TEMPORARY STORING COMMANDS BY MEMORY INTERFACES FOR REWRITABLE NON-VOLATILE MEMORY MODULES, MEMORY CONTROL CIRCUIT UNIT AND MEMORY STORAGE DEVICE

CROSS-REFERENCE TO RELATED APPLICATION

This application claims the priority benefit of Taiwan application serial no. 108131205, filed on Aug. 30, 2019. The entirety of the above-mentioned patent application is hereby incorporated by reference herein and made a part of this specification.

BACKGROUND

1. Technology Field

The invention relates to a command transmitting method, a memory control circuit unit and a memory storage device.

2. Description of Related Art

The markets of digital cameras, cellular phones, and MP3 players have expanded rapidly in recent years, resulting in escalated demand for storage media by consumers. The characteristics of data non-volatility, low power consumption, and compact size make a rewritable non-volatile memory module (e.g., a flash memory) ideal to be built in the portable multi-media devices as cited above.

In general, when the memory management circuit receives a high-level command (e.g., a read command, a write command or an erase command) for accessing the rewritable non-volatile memory module from a host system, the memory management circuit needs to convert the high-level command into a command sequence (a.k.a. a low-level language) that the rewritable non-volatile memory module can read before the rewritable non-volatile memory module can execute a corresponding operation according to the command sequence. In the conventional art, before the high-level command is converted into the command sequence, the memory management circuit usually transmits a state read command sequence to the rewritable non-volatile memory module via the memory interface first. When the memory management circuit receives a response signal generated by the rewritable non-volatile memory module according to the state read command sequence, the memory management circuit then selects the high-level command to be executed according to the response signal, converts the determined high-level command into the command sequence, and transmit the command sequence to the rewritable non-volatile memory module for performing an accessing operation.

In other words, a longer latency is usually required between an operation of generating the state read command sequence by the memory management circuit and an operation of transmitting the command sequence to the rewritable non-volatile memory module by the memory management circuit. In particular, if the rewritable non-volatile memory module is constantly in a ready state (i.e., a state that can be used to receive and execute the command sequence) during said latency, there is no command sequence for accessing the rewritable non-volatile memory module substantially executed during that latency. This situation can lead to a problem of inefficient use efficiency of the rewritable non-volatile memory module.

Therefore, how to transmit the command sequence to be executed to the rewritable non-volatile memory module more efficiently and improve the use efficiency of the rewritable non-volatile memory module is one of problems to be solved by those skilled in the art.

SUMMARY

The invention provides a command transmitting method, a memory control circuit unit and a memory storage device capable of improving the use efficiency of the rewritable non-volatile memory module.

The invention proposes a command transmitting method for a rewritable non-volatile memory module. The method includes: transmitting a plurality of command sequences and a state read command sequence to a memory interface coupled to the rewritable non-volatile memory module; and storing the plurality of command sequences and transmitting the state read command sequence to the rewritable non-volatile memory module by the memory interface.

The invention proposes a memory control circuit unit configured to control a rewritable non-volatile memory module. The memory control circuit unit includes a host interface, a memory interface and a memory management circuit. The host interface is configured to couple to a host system. The memory interface is configured to couple to a rewritable non-volatile memory module. The memory management circuit is coupled to the host interface and the memory interface. The memory management circuit is configured to transmit a plurality of command sequences and a state read command sequence to the memory interface. The memory interface is configured to store the plurality of command sequences, and transmit the state read command sequence to the rewritable non-volatile memory module.

The invention proposes a memory storage device, which includes a connection interface unit, a rewritable non-volatile memory module and a memory control circuit unit. The connection interface unit is configured to couple to a host system. The memory control circuit unit includes a memory management circuit and a memory interface. The memory control circuit unit is coupled to the connection interface unit and coupled to the rewritable non-volatile memory module through the memory interface. The memory management circuit is configured to transmit a plurality of command sequences and a state read command sequence to the memory interface. The memory interface is configured to store the plurality of command sequences, and transmit the state read command sequence to the rewritable non-volatile memory module.

Based on the above, according to the command transmitting method, the memory control circuit unit and the memory storage device of the invention, the response signal does not need to be transmitted to the memory management circuit for determination, and instead, the memory interface directly selects the command sequence that can be executed from the command sequences stored in the memory interface according to the response signal. In this way, the problem of overly long latency between the operation of generating the state read command sequence by the memory management circuit and the operation of transmitting the command sequence for accessing the rewritable non-volatile memory module to the rewritable non-volatile memory module by the memory management circuit in the conventional art can be effectively solved, and the use efficiency of the rewritable non-volatile memory module can also be improved.

To make the aforementioned more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

DESCRIPTION OF THE EMBODIMENTS

Figure 1:
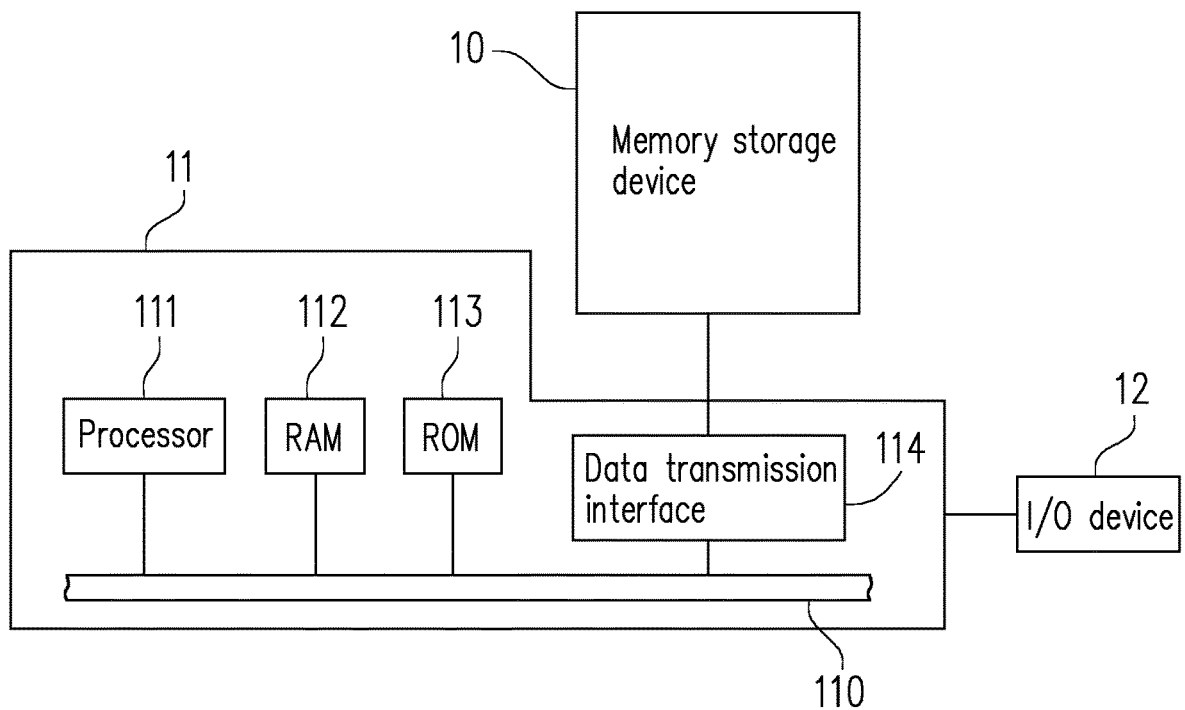
FIG. 1 is a schematic diagram illustrating a host system, a memory storage device and an I/O (input/output) device according to an exemplary embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

Embodiments of the invention may comprise any one or more of the novel features described herein, including in the detailed description, and/or shown in the drawings. As used herein, "at least one," "one or more," and "and/or" are open-ended expressions that are both conjunctive and disjunctive in operation. For instance, each of the expressions "at least on of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In general, a memory storage device (a.k.a. a memory storage system) includes a rewritable non-volatile memory module and a controller (a.k.a. a control circuit). The memory storage device usually operates together with a host system so the host system can write data into the memory storage device or read data from the memory storage device.

Figure 2:
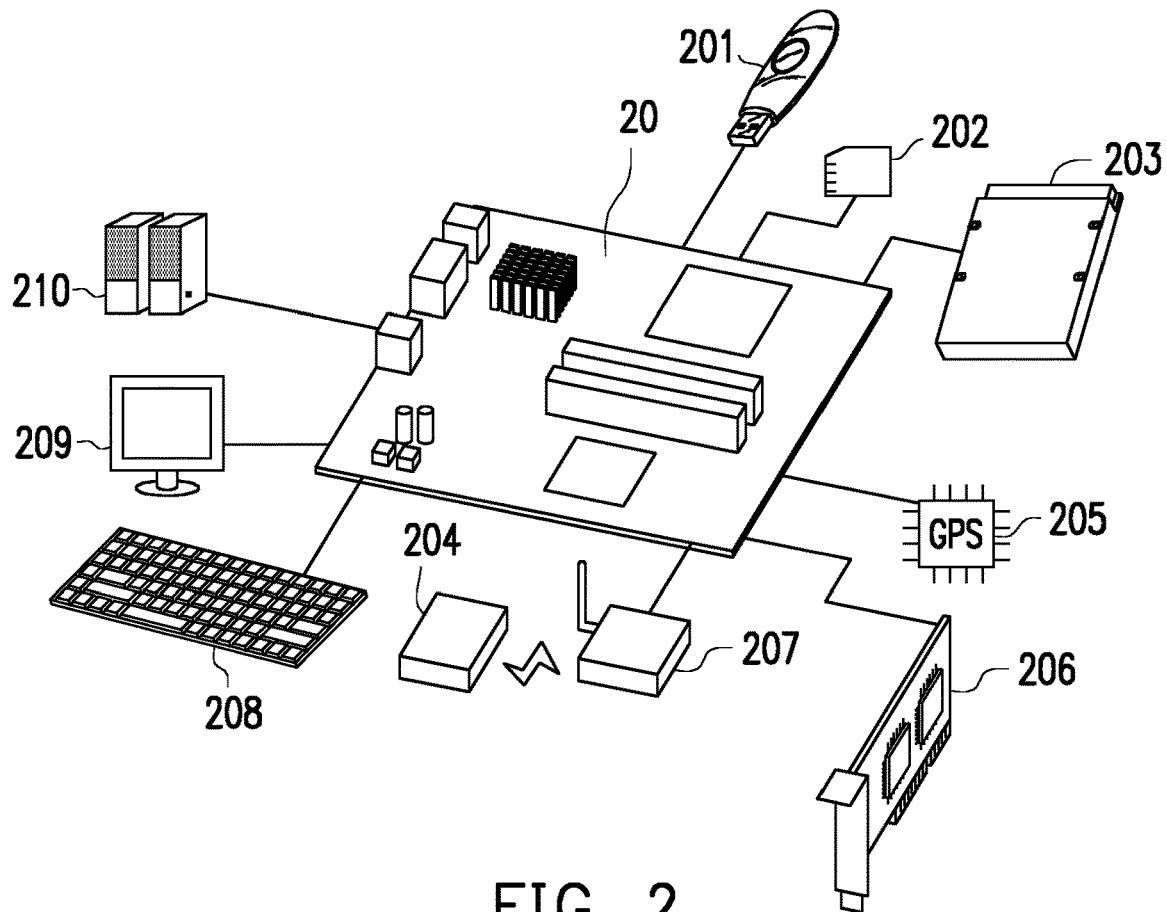
FIG. 2 is a schematic diagram illustrating a host system, a memory storage device and an I/O device according to another exemplary embodiment of the invention.

FIG. 1 is a schematic diagram illustrating a host system, a memory storage device and an I/O (input/output) device according to an exemplary embodiment of the invention. FIG. 2 is a schematic diagram illustrating a host system, a memory storage device and an I/O device according to another exemplary embodiment of the invention.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In this exemplary embodiment, the host system 11 is coupled to a memory storage device 10 through the data transmission interface 114. For example, the host system 11 can store data into the memory storage device 10 or read data from the memory storage device 10 via the data transmission interface 114. Further, the host system 11 is coupled to an I/O device 12 via the system bus 110. For example, the host system 11 can transmit output signals to the I/O device 12 or receive input signals from the I/O device 12 via the system bus 110.

In the present exemplary embodiment, the processor 111, the RAM 112, the ROM 113 and the data transmission interface 114 may be disposed on a main board 20 of the host system 11. The number of the data transmission interface 114 may be one or more. Through the data transmission interface 114, the main board 20 may be coupled to the memory storage device 510 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication) memory storage device, a WiFi (Wireless Fidelity) memory storage device, a Bluetooth memory storage device, a BLE (Bluetooth low energy) memory storage device (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 can access the wireless memory storage device 204 via the wireless transmission device 207.

Figure 3:
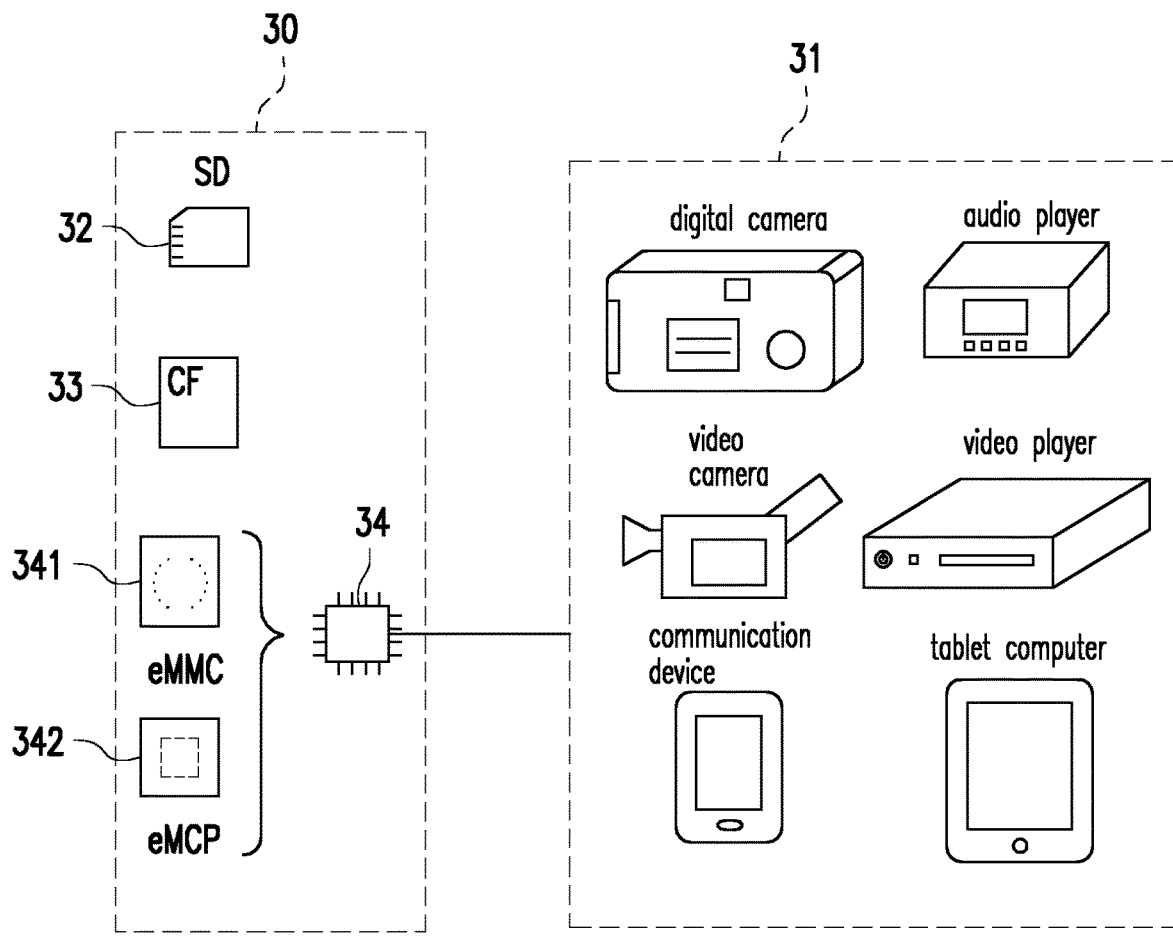
FIG. 3 is a schematic diagram illustrating a host system and a memory storage device according to another exemplary embodiment of the invention.

In an exemplary embodiment, aforementioned host system may be any system capable of substantially cooperating with the memory storage device for storing data. Although the host system is illustrated as a computer system in foregoing exemplary embodiment, nonetheless, FIG. 3 is a schematic diagram illustrating a host system and a memory storage device according to another exemplary embodiment of the disclosure. Referring to FIG. 3, in another exemplary embodiment, a host system 31 may also be a system such as a digital camera, a video camera, a communication device, an audio player, a video player or a tablet computer, whereas a memory storage device 30 may be various non-volatile memory storage devices used by the host system 931, such as a SD (Secure Digital) card 32, a CF (Compact Flash) card 33 or an embedded storage device 34. The embedded storage device 34 includes various embedded storage devices capable of directly coupling a memory module onto a substrate of the host system, such as an eMMC (embedded Multi Media Card) 341 and/or an eMCP (embedded Multi Chip Package) storage device 342.

Figure 4:
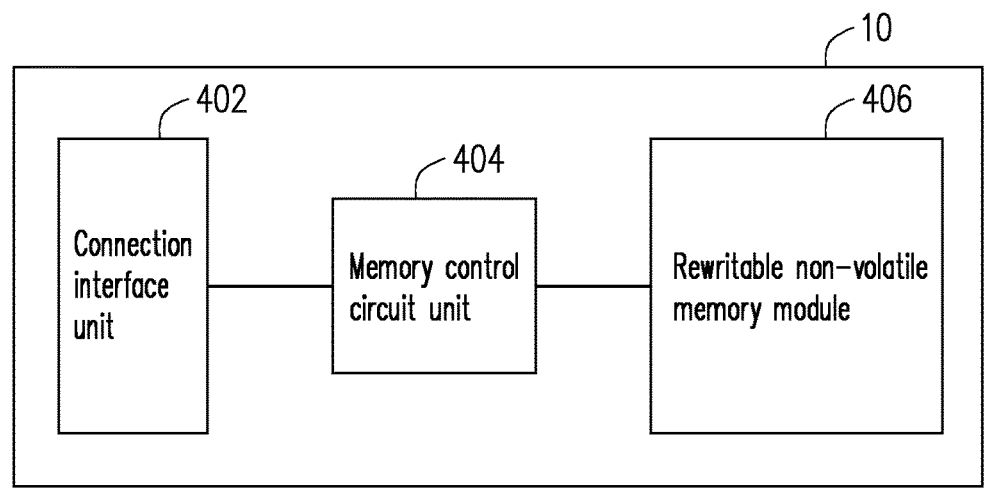
FIG. 4 is a schematic block diagram illustrating a memory storage device according to an exemplary embodiment of the invention.

FIG. 4 is a schematic block diagram illustrating a memory storage device according to an exemplary embodiment of the invention.

Referring to FIG. 4, the memory storage device 10 includes a connection interface unit 402, a memory control circuit unit 404 and a rewritable non-volatile memory module 406.

The connection interface unit 402 is configured to couple to the memory storage device 10 to the host system 11. In the present exemplary embodiment, the connection interface unit 402 is compatible with a PCI Express (Peripheral Component Interconnect Express) interface standard, and is also compatible with an NVM express interface standard. Specifically, the NVM express interface standard refers to a protocol for communication between the host system and the memory storage device, which defines register interface, command set and feature set between a controller of the memory storage device and an operating system of the host system and aims to improve a data access speed and a data transmission rate for the PCIe interface-based memory storage device by optimizing the interface standard of the memory storage device. However, in another exemplary embodiment, the connection interface unit 402 may also be compatible with other suitable standards. In addition, the connection interface unit 402 and the memory control circuit unit 404 may be packaged into one chip, or the connection interface unit 402 is distributed outside of a chip containing the memory control circuit unit 404.

The memory control circuit unit 404 is configured to execute a plurality of logic gates or control commands which are implemented in a hardware form or in a firmware form and perform operations of writing, reading or erasing data in the rewritable non-volatile memory storage module 406 according to the commands of the host system 11.

The rewritable non-volatile memory module 406 is coupled to the memory control circuit unit 404 and configured to store data written from the host system 11. The rewritable non-volatile memory module 406 may be a SLC (Single Level Cell) NAND flash memory module (i.e., a flash memory module capable of storing one bit in one memory cell), an MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), other flash memory modules or other memory modules having the same features.

In the rewritable non-volatile memory module 406, one or more bits are stored by changing a voltage (hereinafter, also known as a threshold voltage) of each of the memory cells. More specifically, in each of the memory cells, a charge trapping layer is provided between a control gate and a channel. Amount of electrons in the charge trapping layer may be changed by applying a write voltage to the control gate thereby changing the threshold voltage of the memory cell. This operation of changing the threshold voltage of the memory cell is also known as "writing data into the memory cell" or "programming the memory cell". By changing the threshold voltage, each of the memory cells in the rewritable non-volatile memory module 406 can have a plurality of storage states. The storage state to which the memory cell belongs may be determined by applying a read voltage to the memory cell, so as to obtain the one or more bits stored in the memory cell.

In the present exemplary embodiment, the memory cells of the rewritable non-volatile memory module 406 constitute a plurality of physical programming units, and the physical programming units constitute a plurality of physical erasing units. Specifically, the memory cells on the same word line constitute one or more of the physical programming units. If each of the memory cells can store two or more bits, the physical programming units on the same word line can be at least classified into a lower physical programming unit and an upper physical programming unit. For instance, a least significant bit (LSB) of one memory cell belongs to the lower physical programming unit, and a most significant bit (MSB) of one memory cell belongs to the upper physical programming unit. Generally, in the MLC NAND flash memory, a writing speed of the lower physical programming unit is higher than a writing speed of the upper physical programming unit, and/or a reliability of the lower physical programming unit is higher than a reliability of the upper physical programming unit.

In this exemplary embodiment, the physical programming unit is the minimum unit for programming. That is, the physical programming unit is the minimum unit for writing data. For example, the physical programming unit is a physical page or a physical sector. If the physical programming unit is the physical page, these physical programming units usually include a data bit area and a redundancy bit area. The data bit area includes multiple physical sectors configured to store user data, and the redundant bit area is configured to store system data (e.g., management data such as the error correcting code). In this exemplary embodiment, the data bit area contains 32 physical sectors, and a size of each physical sector is 512 bytes (B). However, in other exemplary embodiments, the data bit area may also contain 8, 16 physical sectors or different number (more or less) of the physical sectors, and the size of each physical sector may also be greater or smaller. On the other hand, the physical erasing unit is the minimum unit for erasing. Namely, each physical erasing unit contains the least number of memory cells to be erased together. For instance, the physical erasing unit is a physical block.

Figure 5:
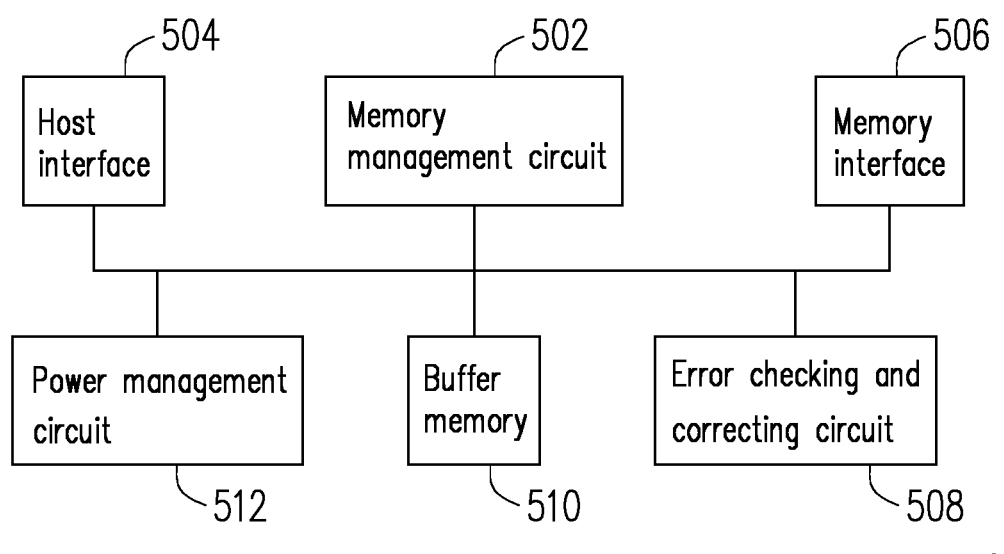
FIG. 5 is a schematic block diagram illustrating a memory control circuit unit according to an exemplary embodiment of the invention.

FIG. 5 is a schematic block diagram illustrating a memory control circuit unit according to an exemplary embodiment of the invention.

Referring to FIG. 5, the memory control circuit unit 404 includes a memory management circuit 502, a host interface 504 and a memory interface 506.

The memory management circuit 502 is configured to control overall operations of the memory control circuit unit 404. Specifically, the memory management circuit 502 has a plurality of control commands. When the memory storage device 10 operates, the control commands are executed to perform various operations such as data writing, data reading and data erasing. Hereinafter, operations of the memory management circuit 502 are described as equivalent to operations of the memory control circuit unit 404.

In this exemplary embodiment, the control commands of the memory management circuit 502 are implemented in form of firmware. For instance, the memory management circuit 502 has a microprocessor unit (not illustrated) and a ROM (not illustrated), and the control commands are burned into the ROM. When the memory storage device 10 operates, the control commands are executed by the microprocessor to perform operations of writing, reading or erasing data.

In another exemplary embodiment, the control commands of the memory management circuit 502 may also be stored as program codes in a specific area (for example, a system area in a memory exclusively used for storing system data) of the rewritable non-volatile memory module 406. In addition, the memory management circuit 502 has a microprocessor unit (not illustrated), a ROM (not illustrated) and a RAM (not illustrated). More particularly, the ROM has a boot code, which is executed by the microprocessor unit to load the control commands stored in the rewritable non-volatile memory module 406 to the RAM of the memory management circuit 502 when the memory control circuit unit 404 is enabled. Then, the control commands are executed by the microprocessor unit to perform operations, such as writing, reading or erasing data.

Further, in another exemplary embodiment, the control commands of the memory management circuit 502 may also be implemented in form of hardware. For example, the memory management circuit 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory cell management circuit is configured to manage the memory cells of the rewritable non-volatile memory module 406 or a group thereof. The memory writing circuit is configured to issue a write command sequence for the rewritable non-volatile memory module 406 to write data into the rewritable non-volatile memory module 406. The memory reading circuit is configured to issue a read command sequence for the rewritable non-volatile memory module 406 to read data from the rewritable non-volatile memory module 406. The memory erasing circuit is configured to issue an erase command sequence for the rewritable non-volatile memory module 406 to erase data from the rewritable non-volatile memory module 406. The data processing circuit is configured to process data to be written into the rewritable non-volatile memory module 406 and data read from the rewritable non-volatile memory module 406. Each of the write command sequence, the read command sequence and the erase command sequence may include one or more program codes or command codes and instruct the rewritable non-volatile memory module 406 to execute the corresponding operations, such as writing, reading and erasing. In an exemplary embodiment, the memory management circuit 502 may further issue command sequences of other types to instruct the rewritable non-volatile memory module 406 to execute the corresponding operations.

The host interface 504 is coupled to the memory management circuit 502 and configured to receive and identify commands and data sent from the host system. In other words, the commands and data transmitted by the host system 11 are transmitted to the memory management circuit 502 via the host interface 504. In this exemplary embodiment, the host interface 504 is compatible with the PCI Express standard. Nevertheless, it should be understood that the invention is not limited to the above. The host interface 504 may also compatible with the PATA standard, the IEEE 1394 standard, the SATA standard, the USB standard, the SD standard, the UHS-I standard, the UHS-II standard, the MS standard, the MMC standard, the eMMC standard, the UFS standard, the CF standard, the IDE standard, or other suitable standards for data transmission.

The memory interface 506 is coupled to the memory management circuit 502 and configured to access the rewritable non-volatile memory module 406. In other words, data to be written into the rewritable non-volatile memory module 406 is converted into a format acceptable by the rewritable non-volatile memory module 406 via the memory interface 506. Specifically, if the memory management circuit 502 intends to access the rewritable non-volatile memory module 406, the memory interface 506 sends corresponding command sequences. For example, the command sequences may include the write command sequence as an instruction for writing data, the read command sequence as an instruction for reading data, the erase command sequence as an instruction for erasing data, and other corresponding command sequences as instructions for performing various memory operations (e.g., changing read voltage levels or performing a garbage collection procedure). These command sequences are generated by the memory management circuit 502 and transmitted to the rewritable non-volatile memory module 406 through the memory interface 506, for example. The command sequences may include one or more signals, or data transmitted in the bus. The signals or the data may include command codes and program codes. For example, information such as identification codes and memory addresses are included in the read command sequence;

In an exemplary embodiment, the memory control circuit unit 404 further includes an error checking and correcting circuit 508, a buffer memory 510 and a power management circuit 512.

The error checking and correcting circuit 508 is coupled to the memory management circuit 502 and configured to perform an error checking and correcting operation to ensure the correctness of data. Specifically, when the memory management circuit 502 receives the writing command from the host system 11, the error checking and correcting circuit 508 generates an error correcting code (ECC) or an error detecting code (EDC) for data corresponding to the writing command, and the memory management circuit 502 writes data and the ECC or the EDC corresponding to the writing command to the rewritable non-volatile memory module 406. Then, when the memory management circuit 502 reads the data from the rewritable non-volatile memory module 406, the corresponding ECC and/or the EDC are also read, and the error checking and correcting circuit 508 performs the error checking and correcting operation on the read data based on the ECC and/or the EDC.

The buffer memory 510 is coupled to the memory management circuit 502 and configured to temporarily store data and commands from the host system 11 or data from the rewritable non-volatile memory module 406. The power management unit 512 is coupled to the memory management circuit 502 and configured to control a power of the memory storage device 10.

Figure 6:
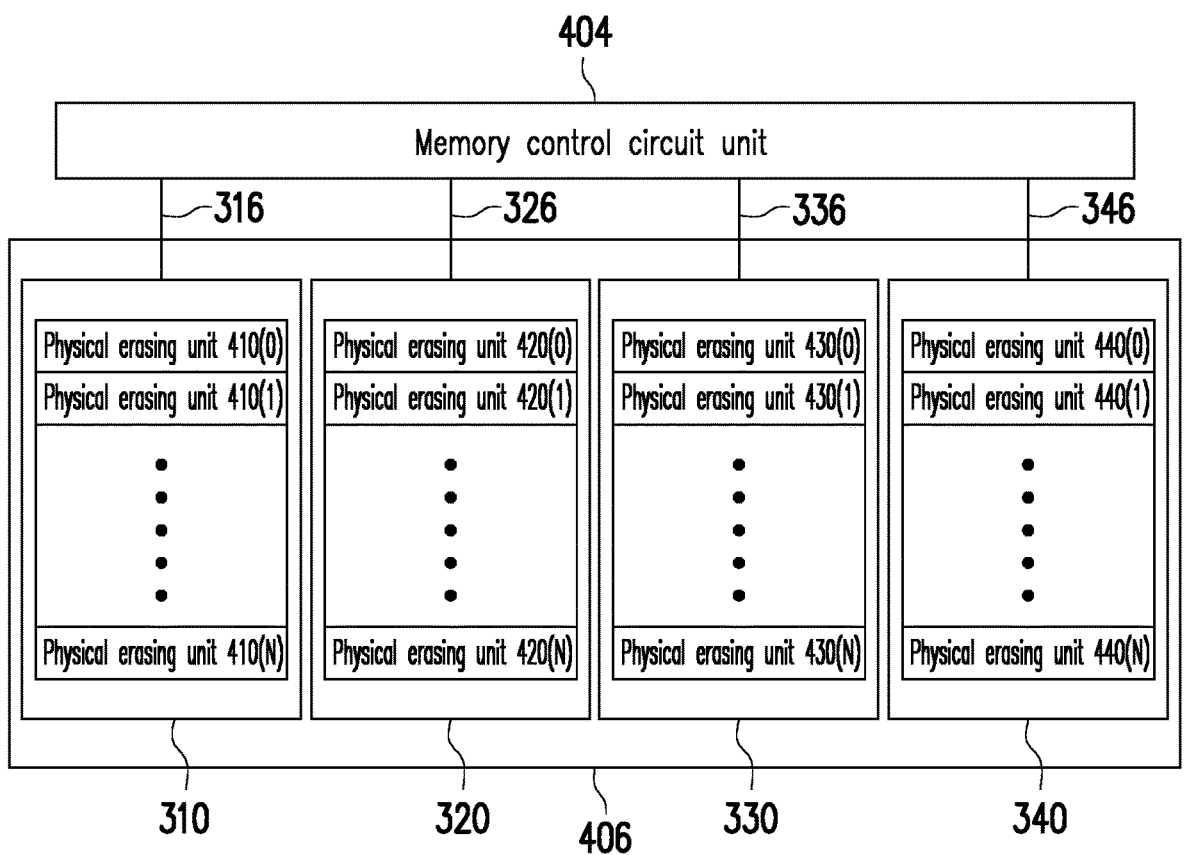
FIG. 6 is a schematic block diagram illustrating a rewritable non-volatile memory module according to an exemplary embodiment of the invention.

FIG. 6 is a schematic block diagram illustrating a rewritable non-volatile memory module according to an exemplary embodiment of the invention.

Referring to FIG. 6, the rewritable non-volatile memory module 406 includes a first memory sub-module 310, a second memory sub-module 320, a third memory sub-module 330 and a fourth memory sub-module 340. For example, each of the first, the second, the third and the fourth memory sub-modules 310, 320, 330 and 340 is a memory die. The first memory sub-module 310 includes physical erasing units 410(0) to 410(N). The second memory sub-module 320 includes physical erasing units 420(0) to 420(N). The third memory sub-module 330 includes physical erasing units 430(0) to 430(N). The fourth memory sub-module 340 includes physical erasing units 440(0) to 440(N).

For example, the first, the second, the third and the fourth memory sub-modules 310, 320, 330 and 340 are coupled to the memory control circuit unit 404 through independent data buses 316, 326, 336 and 346, respectively. Accordingly, the memory management circuit 502 can write data into the first, the second, the third and the fourth memory sub-modules 310, 320, 330 and 340 respectively via the data buses 316, 326, 336 and 346 in a parallel manner.

However, it should be understood that, in another exemplary embodiment of the invention, the first, the second, the third and the fourth memory sub-modules 310, 320, 330 and 340 may also be coupled to the memory control circuit unit 404 through only one data bus. Here, the memory management circuit 502 can write data into the first, the second, the third and the fourth memory sub-modules 310, 320, 330 and 340 respectively via one data bus in an interleave manner.

In particular, each of the first, the second, the third and the fourth memory sub-modules 310, 320, 330 and 340 may include a plurality of word lines. A plurality of memory cells on the same word form a plurality of physical pages, and a plurality of physical pages on the same word line may be referred to as a physical page set. Each of the physical erasing units of the first, the second, the third and the fourth memory sub-modules 310, 320, 330 and 340 has a plurality of physical pages. Here, the physical pages belonging to the same physical erasing unit may be written independently and erased simultaneously. For example, each physical erasing unit is composed of 128 physical pages. Nevertheless, it should be understood that the invention is not limited in this regard. Each physical erasing unit may be composed of 64 physical pages, 256 physical pages or any number of the physical pages.

More specifically, the physical erasing unit is a minimum unit for erasing. Namely, each physical erasing unit contains the least number of memory cells to be erased together. The physical page is the minimum unit for programming. That is, the physical page is the minimum unit for writing data. However, it should be understood that, in another exemplary embodiment of the invention, the minimum unit for writing data may also be a sector or other units. Each of the physical pages usually includes a data bit area and a redundant bit area. The data bit area is configured for storing the user data, and the redundant bit area is configured for storing the system data (e.g., an error checking and correcting (ECC) code). It should be noted that, in another exemplary embodiment, one physical unit may also refer to one physical address, one physical programming unit, or a composition of a plurality of continuous or discontinuous physical addresses.

It is noted that, although the exemplary embodiment of the invention is described by using the rewritable non-volatile memory module 406 that includes two memory sub-modules as an example, the invention is not limited thereto. In other embodiments, the rewritable non-volatile memory module 406 may also include six, eight or ten memory sub-modules.

Figure 7:
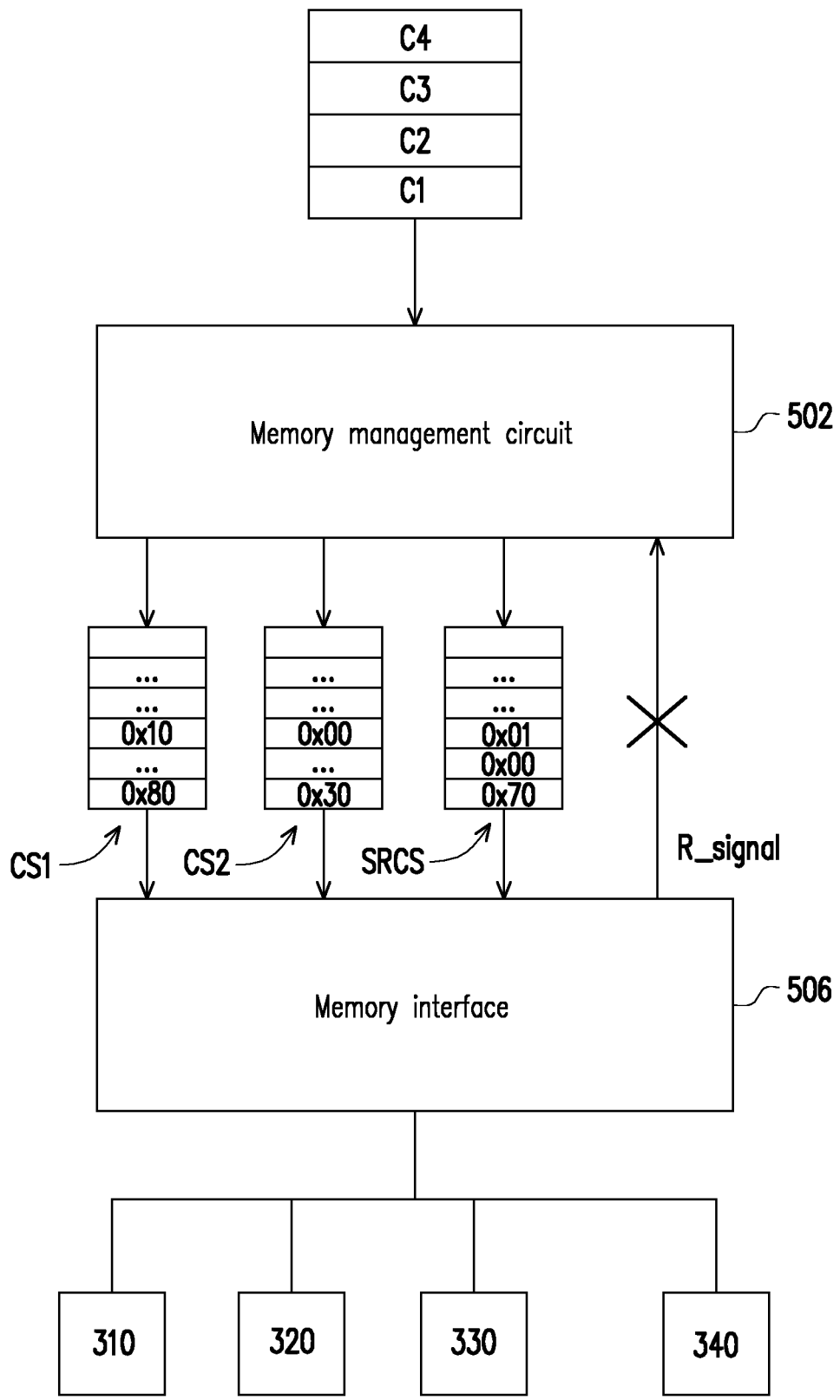
FIG. 7 is a schematic block diagram illustrating a command transmitting method according to an exemplary embodiment of the invention.

FIG. 7 is a schematic block diagram illustrating a command transmitting method according to an exemplary embodiment of the invention.

Referring to FIG. 7, first of all, it is assumed that the memory management circuit 502 receives a plurality of high-level commands C1 to C4 for accessing the rewritable non-volatile memory module 406 from the host system 11. The type of each of the high-level commands C1 to C4 may be the read command, the write command or the erase command and is not limited thereto. Then, the memory management circuit 502 can execute a schedule operation to arrange an executing order of the high-level commands C1 to C4. In this example, it is assumed that after the schedule operation is executed, the executing order obtained by the memory management circuit 502 is the high-level command C1, the high-level command C2, the high-level command C3 and the high-level command C4 in that sequence. Nevertheless, the invention is not intended to limit the executing order generated after the schedule operation is executed.

After the executing order is generated, the memory management circuit 502 can, for example, select the first two high-level commands (i.e., the high-level commands C1 and C2) to be selected from the high-level commands C1 to C4 according to the executing order. Then, the memory management circuit 502 converts the high-level command C1 (a.k.a. a first high-level command) into a command sequence CS1 (a.k.a. a first command sequence), and converts the high-level command C2 (a.k.a. a second high-level command) into a command sequence CS2 (a.k.a. a second command sequence). In particular, in this exemplary embodiment, it is assumed that the command sequence CS1 is used for accessing the first memory sub-module 310, and the command sequence CS2 is used for accessing the second memory sub-module 320.

Then, the memory management circuit 502 transmits the command sequences CS1 and CS2 and a state read command sequence SRCS to the memory interface 506. In this example, the state read command sequence SRCS is used for querying states of the first memory sub-module 310 and the second memory sub-module 320. Here, it should be noted that, the state of one memory sub-module can be divided into, for example, a "ready state" and a "busy state". If the state of one memory sub-module is the ready state, it indicates that the memory sub-module can be used to receive and execute the command sequence for accessing the memory sub-module. If the state of one memory sub-module is the busy state, it indicates that the memory sub-module is currently busy and unable to receive and execute the command sequence.

After the memory management circuit 502 transmits the command sequences CS1 and CS2 and the state read command sequence SRCS to the memory interface 506, the memory interface 506 stores the command sequences CS1 and CS2, and transmits, in the case where the command sequences CS1 and CS2 are stored in the memory interface 506, the state read command sequence SRCS to the first memory sub-module 310 and the second memory sub-module 320 of the rewritable non-volatile memory module 406 via the memory interface 506.

Then, the memory interface 506 receives a response signal R_signal returned by the rewritable non-volatile memory module 406 for responding to the state read command sequence SRCS. In this exemplary embodiment, when the response signal R_signal is used for indicating that the first memory sub-module 310 is in the ready state and the second memory sub-module 320 is in the busy state, the memory interface 506 selects the command sequence CS1 for accessing the first memory sub-module 310 from the command sequences CS1 and CS2 stored in the memory interface 506 according to the response signal R_signal. The memory interface 506 transmits the selected command sequence CS1 to the rewritable non-volatile memory module 406 for accessing the first memory sub-module 310.

It should be noted that, in the command transmitting method of the invention, the response signal R_signal does not need to be transmitted to the memory management circuit 502 for determination, and instead, the memory interface 506 directly selects the command sequence that can be executed from the command sequences CS1 and CS2 stored in the memory interface 506 according to the response signal R_signal. In this way, the problem of overly long latency between the operation of generating the state read command sequence SRCS by the memory management circuit 502 and the operation of transmitting the command sequence for accessing the rewritable non-volatile memory module 406 to the rewritable non-volatile memory module 406 by the memory management circuit 502 in the conventional art can be effectively solved, and the use efficiency of the rewritable non-volatile memory module 406 can also be improved.

It should be noted that, although the foregoing example is described by the memory interface 506 that stores two command sequences as an example, the invention is not limited thereto. In other embodiments, the memory interface 506 may also store more than two command sequences. In addition, although the memory management circuit 502 only transmits one command sequence to the rewritable non-volatile memory module 406 according to the response signal R_signal in the foregoing embodiment, the invention is not limited thereto. In other embodiments, the memory management circuit 502 may also select and transmit a plurality command sequences to the rewritable non-volatile memory module 406 according to the response signal R_signal.

Figure 8:
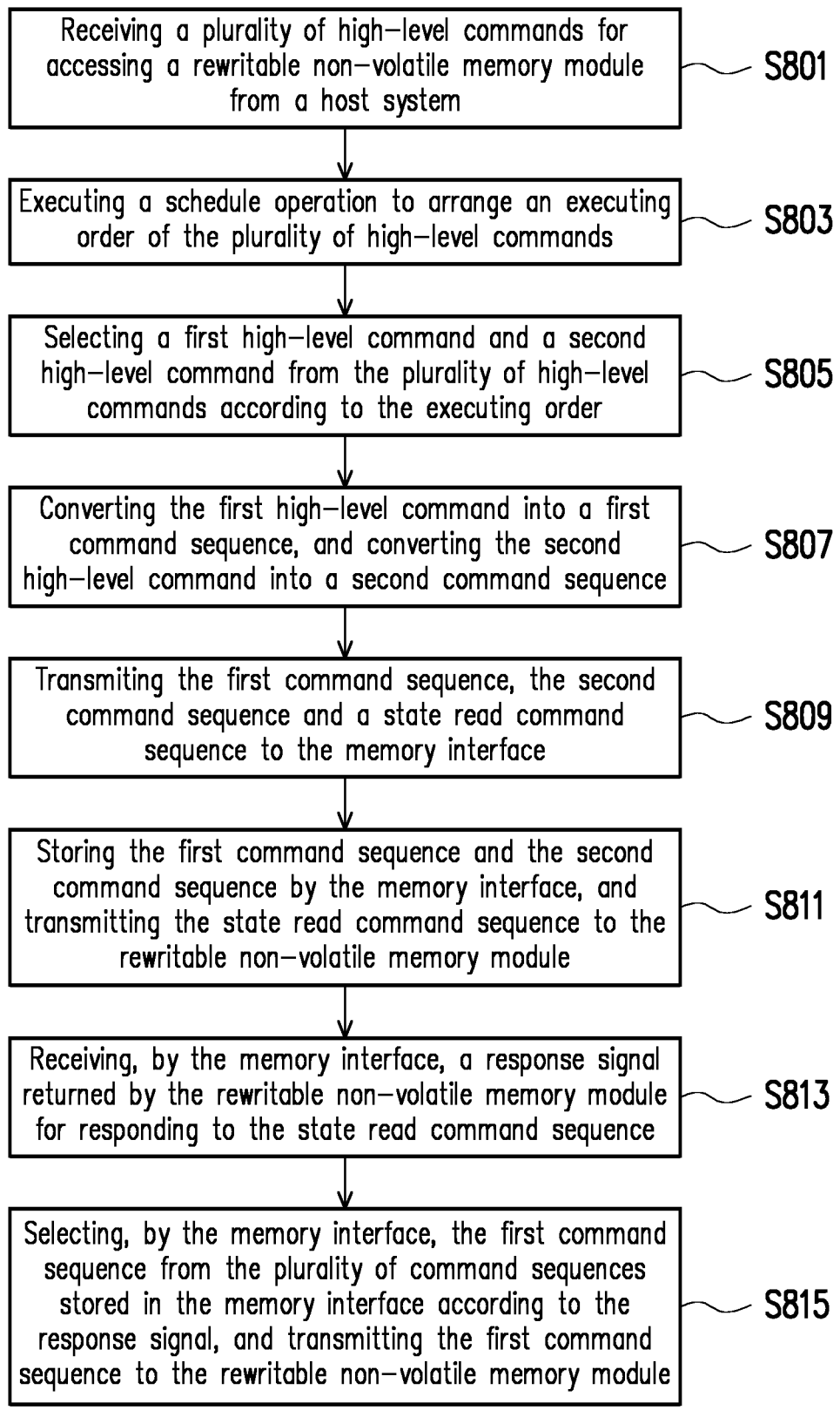
FIG. 8 is a flowchart illustrating a command transmitting method according to an exemplary embodiment of the invention.

FIG. 8 is a flowchart illustrating a command transmitting method according to an exemplary embodiment of the invention.

Referring to FIG. 8, in step S801, the memory management circuit 502 receives a plurality of high-level commands for accessing the rewritable non-volatile memory module 406 from the host system 11. In step S803, the memory management circuit 502 executes a schedule operation to arrange an executing order of the plurality of high-level commands. In step S805, the memory management circuit 502 selects a first high-level command and a second high-level command from the plurality of high-level commands according to the executing order. In step S807, the memory management circuit 502 converts the first high-level command into a first command sequence, and converts the second high-level command into a second command sequence. In step S809, the memory management circuit 502 transmits the first command sequence, the second command sequence and the state read command sequence to the memory interface 506. In step S811, the memory interface 506 stores the first command sequence and the second command sequence, and transmits the state read command sequence to the rewritable non-volatile memory module 406. In step S813, the memory interface 506 receives a response signal returned by the rewritable non-volatile memory module 406 for responding to the state read command sequence. In step S815, the memory interface 506 selects the first command sequence from the plurality of command sequences stored in the memory interface according to the response signal, and transmits the first command sequence to the rewritable non-volatile memory module 406.

In summary, according to the command transmitting method, the memory control circuit unit and the memory storage device of the invention, the response signal does not need to be transmitted to the memory management circuit for determination, and instead, the memory interface directly selects the command sequence that can be executed from the command sequences stored in the memory interface according to the response signal. In this way, the problem of overly long latency between the operation of generating the state read command sequence by the memory management circuit and the operation of transmitting the command sequence for accessing the rewritable non-volatile memory module to the rewritable non-volatile memory module by the memory management circuit in the conventional art can be effectively solved, and the use efficiency of the rewritable non-volatile memory module can also be improved.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

The previously described exemplary embodiments of the present invention have the advantages aforementioned, wherein the advantages aforementioned not required in all versions of the present invention.

It will be apparent to those skilled in the art that various modifications and variations can be made to the structure of the invention without departing from the scope or spirit of the invention. In view of the foregoing, it is intended that the present invention cover modifications and variations of this invention provided they fall within the scope of the following claims and their equivalents.

What is claimed is:

1. A command transmitting method for a rewritable non-volatile memory module, the method comprising:
transmitting, by a memory management circuit, a plurality of command sequences and a state read command sequence to a memory interface coupled to the rewritable non-volatile memory module, wherein the plurality of command sequences include a first command sequence and a second command sequence;
storing the plurality of command sequences by the memory interface, and transmitting the state read command sequence to the rewritable non-volatile memory module,
receiving, by the memory interface, a response signal returned by the rewritable non-volatile memory module for responding to the state read command sequence without transmitting the response signal to the memory management circuit; and
selecting, by the memory interface, the first command sequence from the plurality of command sequences stored in the memory interface according to the response signal, and transmitting the first command sequence to the rewritable non-volatile memory module.

2. The command transmitting method according to claim 1, wherein the rewritable non-volatile memory module comprises a plurality of memory sub-modules, the first command sequence is used for accessing a first memory sub-module in the plurality of memory sub-modules, and the second command sequence is used for accessing a second memory sub-module in the plurality of memory sub-modules.

3. The command transmitting method according to claim 2, wherein the step of selecting, by the memory interface, the first command sequence from the plurality of command sequences stored in the memory interface according to the response signal comprises:
when the response signal is used for indicating that the first memory sub-module is in a ready state and the second memory sub-module is in a busy state, executing the step of selecting, by the memory interface, the first command sequence from the plurality of command sequences stored in the memory interface according to the response signal.

4. The command transmitting method according to claim 1, wherein before the step of transmitting the plurality of command sequences and the state read command sequence to the memory interface coupled to the rewritable non-volatile memory module, the method further comprises:
  receiving a plurality of high-level commands for accessing the rewritable non-volatile memory module from a host system;
  executing a schedule operation to arrange an executing order of the plurality of high-level commands;
  selecting a first high-level command and a second high-level command from the plurality of high-level commands according to the executing order; and
  converting the first high-level command into a first command sequence, and converting the second high-level command into a second command sequence.

5. A memory control circuit unit for controlling a rewritable non-volatile memory module, the memory control circuit unit comprising:
  a host interface, configured to couple to a host system,
  a memory interface, configured to couple to the rewritable non-volatile memory module;
  a memory management circuit, coupled to the host interface and the memory interface,
  wherein the memory management circuit is configured to transmit a plurality of command sequences and a state read command sequence to the memory interface, and the plurality of command sequences include a first command sequence and a second command sequence,
  wherein the memory interface is configured to store the plurality of command sequences, and transmit the state read command sequence to the rewritable non-volatile memory module,
  wherein the memory interface is further configured to receive a response signal returned by the rewritable non-volatile memory module for responding to the state read command sequence without transmitting the response signal to the memory management circuit, select the first command sequence from the plurality of command sequences stored in the memory interface according to the response signal, and transmit the first command sequence to the rewritable non-volatile memory module.

6. The memory control circuit unit according to claim 5, wherein the rewritable non-volatile memory module comprises a plurality of memory sub-modules, the first command sequence is used for accessing a first memory sub-module in the plurality of memory sub-modules, and the second command sequence is used for accessing a second memory sub-module in the plurality of memory sub-modules.

7. The memory control circuit unit according to claim 6, wherein in the operation of selecting the first command sequence from the plurality of command sequences stored in the memory interface according to the response signal,
  when the response signal is used for indicating that the first memory sub-module is in a ready state and the second memory sub-module is in a busy state, the memory interface is further configured to execute the operation of selecting the first command sequence from the plurality of command sequences stored in the memory interface according to the response signal.

8. The memory control circuit unit according to claim 5, wherein before the operation of transmitting the plurality of command sequences and the state read command sequence to the memory interface coupled to the rewritable non-volatile memory module,
  the memory management circuit is further configured to receive a plurality of high-level commands for accessing the rewritable non-volatile memory module from the host system,
  the memory management circuit is further configured to execute a schedule operation to arrange an executing order of the plurality of high-level commands,
  the memory management circuit is further configured to select a first high-level command and a second high-level command from the plurality of high-level commands according to the executing order, and
  the memory management circuit is further configured to convert the first high-level command into a first command sequence, and convert the second high-level command into a second command sequence.

9. A memory storage device, comprising:
  a connection interface unit, configured to couple to a host system;
  a rewritable non-volatile memory module; and
  a memory control circuit unit, comprising a memory management circuit and a memory interface, the memory control circuit unit being coupled to the connection interface unit and coupled to the rewritable non-volatile memory module through the memory interface,
  wherein the memory management circuit is configured to transmit a plurality of command sequences and a state read command sequence to the memory interface, and the plurality of command sequences include a first command sequence and a second command sequence,
  wherein the memory interface is configured to store the plurality of command sequences, and transmit the state read command sequence to the rewritable non-volatile memory module,
  wherein the memory interface is further configured to receive a response signal returned by the rewritable non-volatile memory module for responding to the state read command sequence without transmitting the response signal to the memory management circuit, select the first command sequence from the plurality of command sequences stored in the memory interface according to the response signal, and transmit the first command sequence to the rewritable non-volatile memory module.

10. The memory storage device according to claim 9, wherein the rewritable non-volatile memory module comprises a plurality of memory sub-modules, the first command sequence is used for accessing a first memory sub-module in the plurality of memory sub-modules, and the second command sequence is used for accessing a second memory sub-module in the plurality of memory sub-modules.

11. The memory storage device according to claim 10, wherein in the operation of selecting the first command sequence from the plurality of command sequences stored in the memory interface according to the response signal,
  when the response signal is used for indicating that the first memory sub-module is in a ready state and the second memory sub-module is in a busy state, the memory interface is further configured to execute the operation of selecting the first command sequence from the plurality of command sequences stored in the memory interface according to the response signal.

12. The memory storage device according to claim 9, wherein before the operation of transmitting the plurality of command sequences and the state read command sequence to the memory interface, the memory management circuit is further configured to receive a plurality of high-level commands for accessing the rewritable non-volatile memory module from the host system, the memory management circuit is further configured to execute a schedule operation to arrange an executing order of the plurality of high-level commands, the memory management circuit is further configured to select a first high-level command and a second high-level command from the plurality of high-level commands according to the executing order, and the memory management circuit is further configured to convert the first high-level command into a first command sequence, and convert the second high-level command into a second command sequence.

* * * * *